United States Patent [19]

Alexander, III et al.

[11] Patent Number: 4,941,718
[45] Date of Patent: Jul. 17, 1990

[54] CONCEALED RETRACTABLE HOUSINGS

[75] Inventors: William J. Alexander, III, Mauldin; Fred A. Chapman, Simpsonville, both of S.C.

[73] Assignee: Alexander Machinery, Inc., Mauldin, S.C.

[21] Appl. No.: 171,038

[22] Filed: Mar. 21, 1988

[51] Int. Cl.⁵ ........................................... A47B 88/22
[52] U.S. Cl. ........................................ 312/312; 312/27; 296/37.7; 296/37.8; 248/280.1; 248/281.1
[58] Field of Search .................. 312/21, 204, 242, 247, 312/269, 312, 27; 224/42.41, 310, 311, 327; 296/37.7, 37.8; 49/356; 16/66; 108/44, 45; 248/280.1, 281.1, 421

[56] References Cited

U.S. PATENT DOCUMENTS

| | | | |
|---|---|---|---|
| 1,819,516 | 8/1931 | Kelly | 296/37.7 |
| 1,824,822 | 9/1931 | Kradolfer | 312/27 |
| 1,964,339 | 6/1934 | Brassell | 224/311 |
| 2,176,683 | 10/1939 | Peremi et al. | 49/356 |
| 2,733,109 | 1/1956 | Dooley et al. | 108/45 |
| 2,947,585 | 8/1960 | Fazio | 296/37.7 |
| 3,394,499 | 7/1968 | Korthaus et al. | 49/356 |
| 3,665,549 | 5/1972 | Quinn | 16/66 |
| 3,992,070 | 11/1976 | Dunn et al. | 312/22 |
| 4,230,309 | 10/1980 | Schnitzius | 16/66 |
| 4,368,937 | 1/1983 | Palombo et al. | 296/37.7 |
| 4,381,714 | 5/1983 | Henneberg et al. | 312/312 |
| 4,469,365 | 9/1984 | Marcus et al. | 296/37.8 |
| 4,684,164 | 8/1987 | Durham | 296/37.7 |

Primary Examiner—Peter R. Brown
Assistant Examiner—Brian K. Green
Attorney, Agent, or Firm—Bailey & Hardaway

[57] ABSTRACT

The drawings illustrate an apparatus for housing articles between a ceiling and a roof, utilizing a switch means for actuating suitable electrically operated pivoting means for retracting the apparatus into the ceiling and lowering it from the ceiling.

4 Claims, 3 Drawing Sheets

CONCEALED RETRACTABLE HOUSINGS

BACKGROUND OF THE INVENTION

Concealable housings are needed for the storage of valuables in homes, offices and automobiles. One such housing is illustrated in U.S. Pat. No. 4,684,164, primarily for the concealed housing of radar detectors in automobiles. However, the apparatus of that invention was of such bulk that it required a large distance between the ceiling of the interior and the roof of the vehicle. Also, when in a closed position, the apparatus of the invention does not fit flush against ceiling of the vehicle. Thus, the presence of the apparatus can be detected from outside of the car even though the radar detector itself cannot be seen and, accordingly, the detector is not truly concealed.

Accordingly, it is an important object of the invention to provide a compact apparatus which is automatically operable to conceal valuables between the roof and exposed inner surface of the vehicle to avoid exposure to view from outside the vehicle.

Another important object of the invention is to provide a novel automatic device for the concealed storage of articles in a home, car or office.

SUMMARY OF THE INVENTION

The present apparatus is an improvement of the housing for storing a radar detector of U.S. Pat. No. 4,684,164 the disclosure of which is herein incorporated by reference. It has been found that an apparatus may be provided for concealing articles between a ceiling and a roof by providing a lower support, pivotal means for lowering and retracting the support, electrically operable means of pivoting the means for lowering and retracting, and a switch for operating the electrically operated means, whereby the articles may be easily concealed above the ceiling and lowered by actuation of the switch.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate an apparatus for housing articles between a roof and a ceiling. While it is contemplated that the apparatus of this invention will be primarily employed for the housing and concealment of articles such as compact disc players, tape decks and radar detectors between the roof and the exposed inner surface of a vehicle, this invention may be used for the safe storage of articles above the ceiling of a home or office and, with only minor adjustments, for the safekeeping of articles in the dead space behind walls.

The apparatus includes a support A. Pivotal means B carry the support for movement from an operable position to a retracted position between the roof and said exposed surface. Electrically operated means 24 pivot the means carrying the support from the operable position to the retracted position. Suitable switch means actuates the electrically operated means. A cover panel E has an exposed surface compatible with the exposed inner surface and in substantial alignment or flush therewith when the support is in retracted position.

Figure 1:
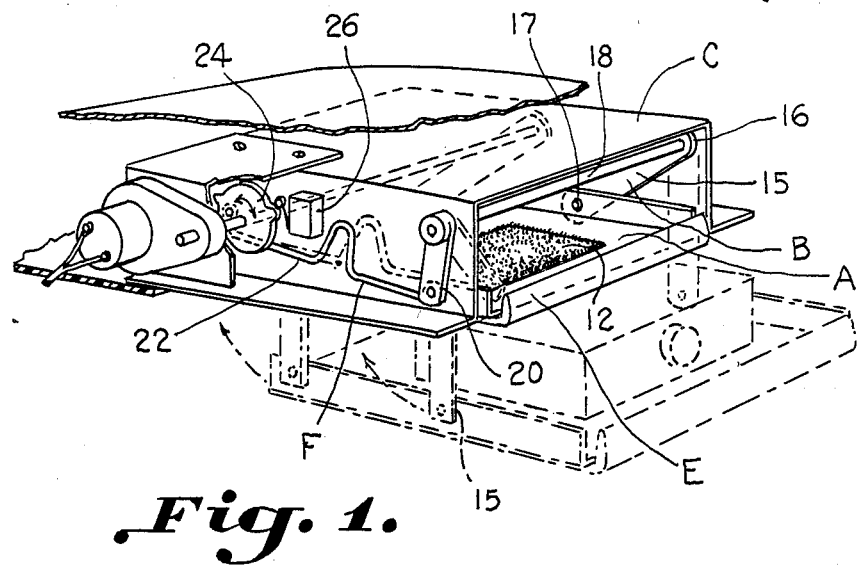
FIG. 1 is a perspective view illustrating an apparatus constructed in accordance with the present invention.

FIG. 1 illustrates the apparatus of this invention in its retracted position with the apparatus in its open, operable position shown in phantoms. The support A is provided in the form of a panel or substantially rectangular block A for carrying a Velcro pad 12 receiving a Velcro pad or strip carried by an opposite portion of the article to be housed.

Figure 2:
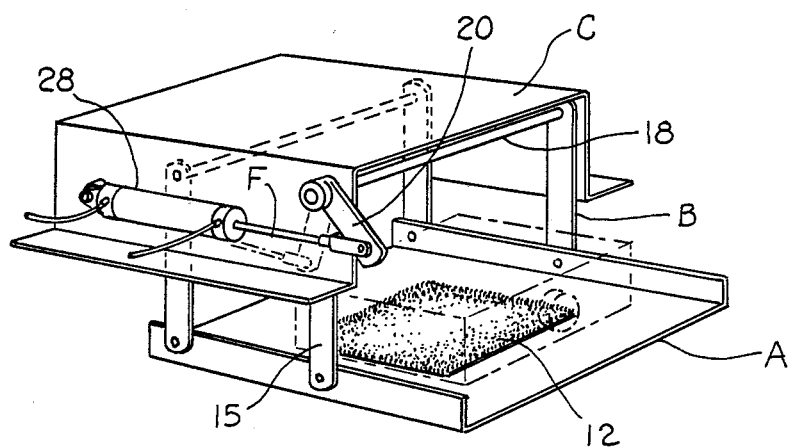
FIG. 2 is a perspective view illustrating an alternate form of the invention wherein the retraction means of the apparatus is a cylinder with a spring return.

The support A is carried by pivotal means B on frame C in the form of bars 15 pivotally mounted at one end to the frame as at 16 and at the other end to the support as at 17. Horizontal linkage 18 connects corresponding bars 16 for uniform lowering and raising of the two sides of support A carrying opposite bars 15. Preferably one of the bars 15 carries protruding tab 20 on which is pivotally mounted retraction means F. Referring to FIG. 1, retraction means F is shown as connector 22, pivotally mounted at one end to protruding tab 20 and carried at the opposite end by electrically operable means 24 controlled by switch 26. Thus, when the apparatus is in its retracted position, actuation of switch 26 rotates electrically operable means 24 causing connector 22 to swing protruding tab 20 up and forward thereby swinging out bars 15 and lowering and swinging forward support A. To then retract the apparatus the switch is again actuated to rotate electrically operable means 24 causing connector 22 to swing down and back protruding tab 20 thereby swinging in bars 15 and raising and swinging back support A. FIG. 2 illustrates an alternate form of the invention wherein a retraction means F is a pressurized cylinder 28 with a spring return. Operation of the cylinder 28 swings protruding tab 20 up and forward thereby swinging out bars 15 and lowering support A. Operation of the cylinder 28 also swings the protruding tab 20 down and back, swinging bars 15 in and lifting support A.

Figure 3:
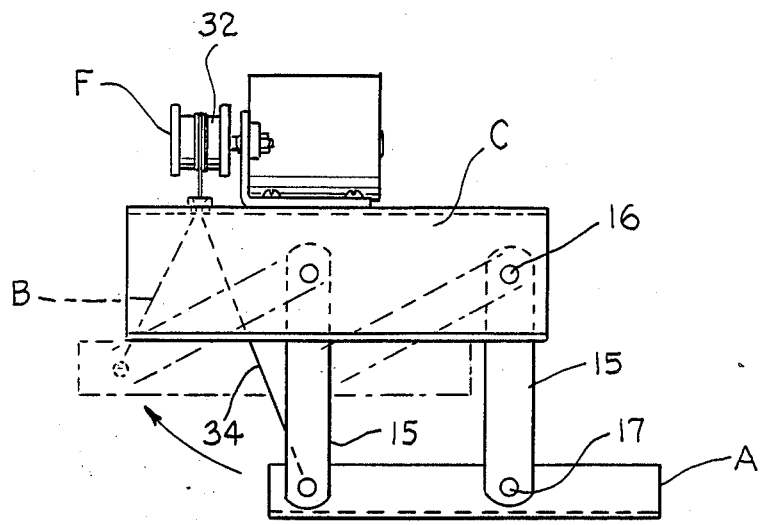
FIG. 3 is a side view illustrating an alternate form of the invention wherein the retraction means of the apparatus is a spool operator.
Figure 4:
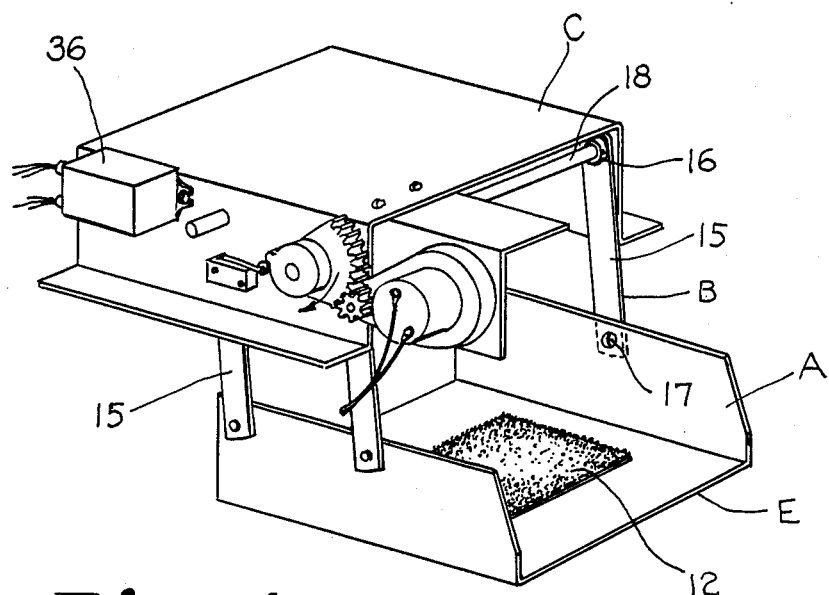
FIG. 4 is a perspective view illustrating an alternate form of the invention wherein the switch means of the apparatus is a relay switch.

FIG. 3 illustrates another form of the invention wherein retraction means F is a spool operator 32 with cord 34 attached to support A. FIG. 4 illustrates yet another form of the invention with a relay switch 36. Relay switch 36 allows for automatic actuation of the electrically operated means responsive to cessation and operation of the vehicle.

Figure 5:
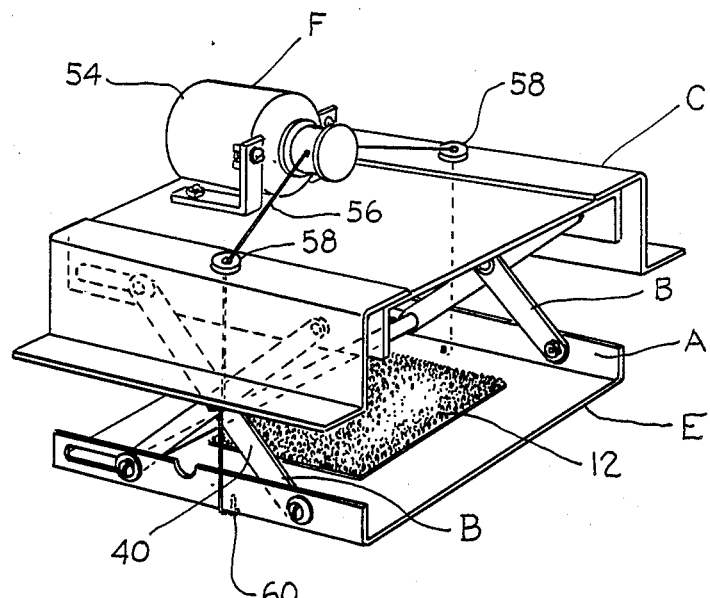
FIG. 5 is a perspective view illustrating an alternate form of the invention with an alternate pivotal means.
Figure 6:
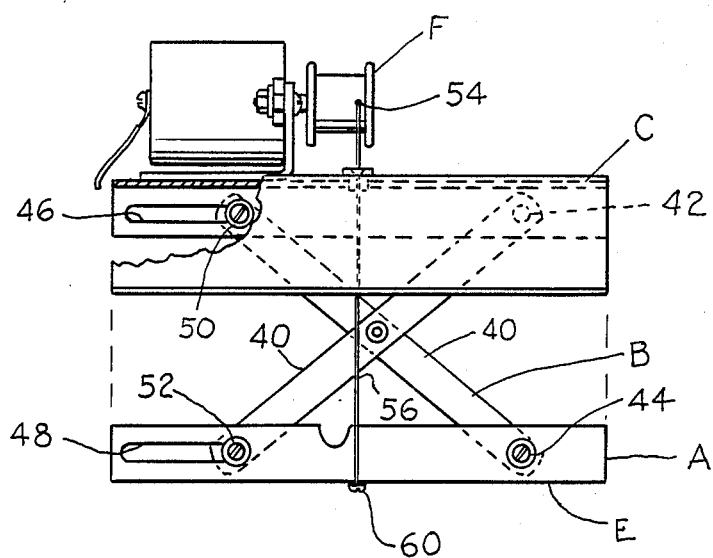
FIG. 6 is a side view of the apparatus of FIG. 5.

FIGS. 5 and 6 show still another form of the invention. Cross bars 40 are pivotally mounted to frame C as at 42 and pivotally mounted to support A as at 44. Slats 46 and 48 are provided in frame C and support A respectively so that one cross bar is slideably secured to frame C as at 50 and the other is slideably secured to support A as at 52. In this form retraction means F is a spool operator 54 with cord 56 extending through openings 58 in frame C and attached at opposite points 60 to support A. Unlike the forms of the invention shown in FIGS. 1-4, the instant form does not swing the support down and forward but merely lowers the support.

While a preferred embodiment of the invention has been described using specific terms, such description is for illustrative purposes only, and it is to be understood that changes and variations may be made without departing from the spirit or scope of the following claims.

What is claimed is:

1. Apparatus for concealing an article between a ceiling and a roof comprising:
   a frame between the ceiling and the roof;
   a lower support for said article;
   pivotal means pivotally mounted to said frame and said lower support carrying said support for movement from a retracted position within said frame between the roof and ceiling to a position below the ceiling;
   said pivotal means including means for lowering and swinging forward said lower support;
   electrically operated means operating said pivotal means for movement of said support from said retracted position to said position below the ceiling and for returning said support to said retracted position;
   said means pivotal means including for maintaining said lower support level during movement; and
   switch means actuating said electrically operated means;
   whereby said position below the ceiling is below and in front of said retracted position.

2. Apparatus for concealing an article between a ceiling and a roof comprising:
   a frame between the ceiling and the roof;
   a lower support for said article;
   pivotal means pivotally mounted to said frame and said lower support carrying said support for movement from a retracted position within said frame between the roof and ceiling to a position below the ceiling wherein said pivotal means includes means for lowering and swinging forward said lower support;
   whereby said position below the ceiling is below and in front of said retracted position;
   electrically operated means including a retraction means operating said pivotal means for movement of said support from said retracted position to said position below the ceiling and for returning said support to said retracted position; and
   said means pivotal means including for maintaining said lower support level during movement;
   whereby said article may be readily concealed from view above said ceiling and readily returned to view below said ceiling.

3. The structure set forth in claim 2 wherein said retraction means is a pressurized cylinder.

4. The structure set forth in claim 2 wherein said retraction means is a spool operator with a cord.

* * * * *